United States Patent [19]

Nishikawa et al.

[11] Patent Number: 4,495,474

[45] Date of Patent: Jan. 22, 1985

[54] PLL CONTROL CIRCUIT FOR RECOVERY OF DATA FROM AUDIO DISK

[75] Inventors: Meisei Nishikawa; Yukio Nakamura, both of Yokohama; Tadashi Kojima, Yokosuka, all of Japan

[73] Assignee: Tokyo Shibaura Denki Kabushiki Kaisha, Kawasaki, Japan

[21] Appl. No.: 426,758

[22] Filed: Sep. 29, 1982

[30] Foreign Application Priority Data

Jun. 15, 1982 [JP] Japan .................................. 57-102818

[51] Int. Cl.³ ............................................... H03L 7/10
[52] U.S. Cl. ......................................... 331/11; 331/17; 369/59
[58] Field of Search ........................ 331/10, 11, 12, 17; 360/37.1; 369/18, 47, 50, 59; 375/120

[56] References Cited

U.S. PATENT DOCUMENTS

| 4,338,683 | 7/1982 | Furukawa et al. | 369/59 X |
| 4,397,011 | 8/1983 | Ogawa | 369/59 X |
| 4,439,849 | 3/1984 | Nabeshima | 369/50 |

Primary Examiner—Eugene R. LaRoche
Assistant Examiner—D. C. Mis
Attorney, Agent, or Firm—Cushman, Darby and Cushman

[57] ABSTRACT

A phase locked loop control circuit for a digital audio disk system is disclosed which has a voltage-controlled oscillator (VCO), a reference signal generator for generating a reference signal corresponding to the phase state of a digital audio signal when the digital audio signal is reproduced or read out and which is recorded on a digital audio disk (DAD) to have a maximum or minimum inverting period value predetermined by the eight to fourteen modulation method, a phase comparator connected to the output terminal of the reference signal generator and the VCO, a detector for detecting the maximum inverting period value included in the digital audio signal; and an adder for adding outputs from the phase comparator and the detector and for supplying a sum result as an oscillation control signal to the VCO.

8 Claims, 3 Drawing Figures

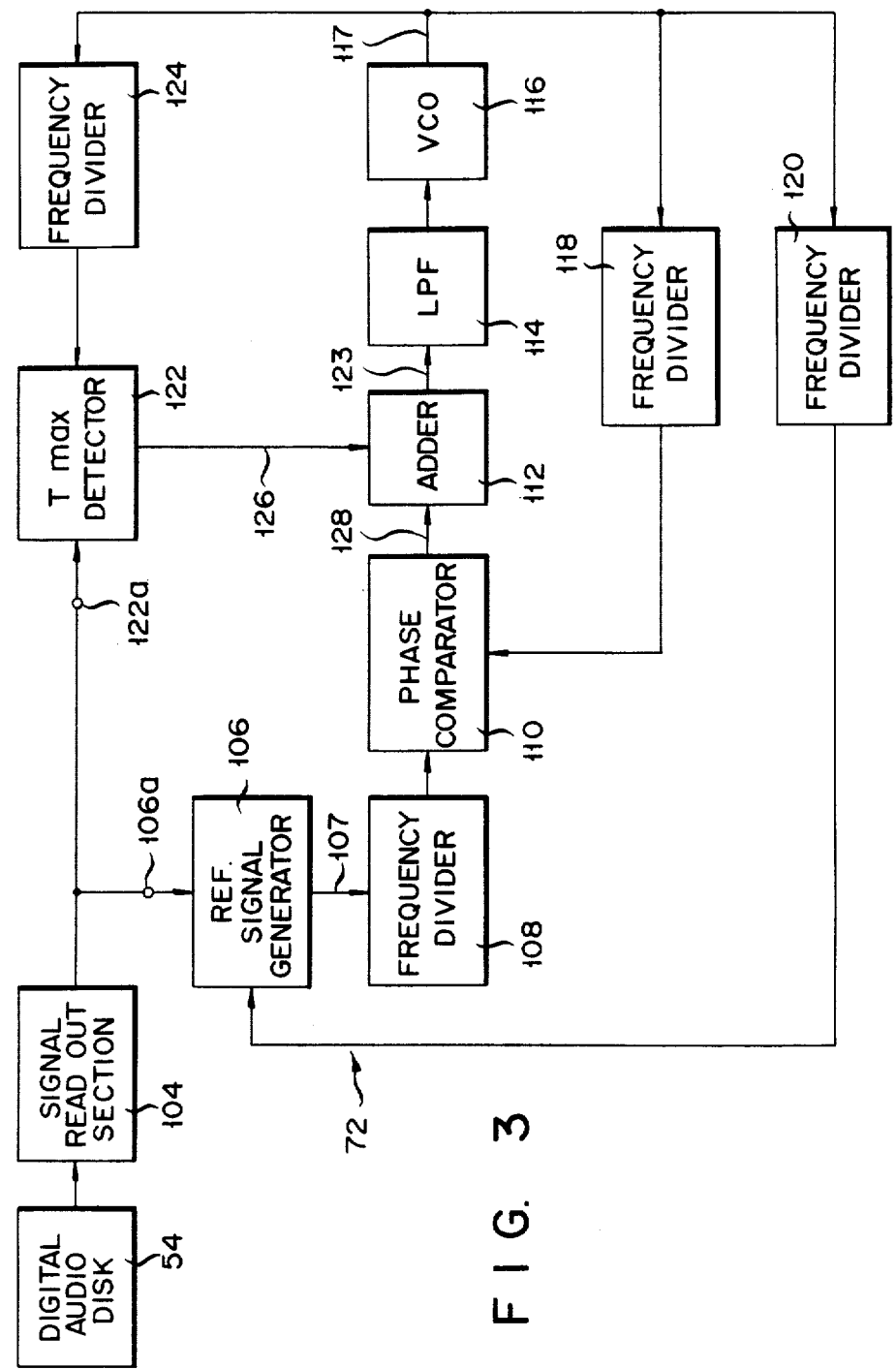
F I G. 3

PLL CONTROL CIRCUIT FOR RECOVERY OF DATA FROM AUDIO DISK

BACKGROUND OF THE INVENTION

The present invention relates to a phase locked loop (PLL) control circuit and, more particularly, to a PLL control circuit used for a digital recording/reproducing device for converting an information signal to a digital signal so as to magnetically or optically record it on a data recording medium such as a tape or disk and reproduce it therefrom.

A pulse code modulation (PCM) system which converts an analog signal such as an audio signal to a digital signal has been recently developed due to the high quality of reproduction signals. For recording an audio signal in accordance with the PCM system, an analog signal is sampled, quantified, and coded to generate a binary signal which is then recorded on data recording medium such as an optical disk. At this time, after being encoded on the basis of error correction technique, the signal is modulated by the eight to fourteen modulation (EFM) system, for example.

A conventional PLL control circuit used with a PCM digital reproducing device such as a digital audio disk (DAD) system, the PLL control operation is performed on the basis of detection of only the phase component of a reproduction signal picked up from the digital audio disk (DAD). However, such PLL control operation may not work well since the frequency of a sync clock pulse signal produced by a voltage-controlled oscillator (VCO) may often become abnormal even if the conventional PLL control circuit is correctly phase-locked. As a result, in the conventional PLL control circuit, the capture range of the VCO is narrowed, so that an undesirably large hysteresis is formed between the capture range and the locking range.

SUMMARY OF THE INVENTION

It is an object of the present invention to provide a new and improved phase locked loop (PLL) control circuit which prevents a narrowing of a capture range and a large change in a hysteresis between the capture range and a locking range, and which quickly performs a phase lock from a free-running frequency to a normal frequency.

The PLL control circuit according to the present invention is used for a system such as a digital audio disk (DAD) system which reproduces an information signal stored in a desired type of information recording medium such as a digital audio disk (DAD). An oscillating device is provided to oscillate at a given frequency and to produce an oscillation signal having a variable frequency from its output terminal. For reading out or reproducing the digital information signal which is modulated to have a specific period value between the minimum and maximum limit values determined in accordance with a chosen modulation system, a signal generating device generates a first electrical signal which is controlled in accordance with a phase state of the digital information signal. A comparing device is connected to the oscillating device and the signal generating device. The comparing device compares the oscillation signal with the first electrical signal. If an error is detected by a difference between the oscillation signal and the first electrical signal, a second electrical signal corresponding to the error signal is produced by the comparing device. A detecting device detects the deviation between the specific period value and a value determined by the oscillation signal from the oscillating device and generates a third electrical signal corresponding to the deviation value described above. An adder device is connected to the output terminals of the comparing device and the detecting device. The adder device receives the second and third electrical signals and adds the second electrical signal to the third electrical signal. Sum data is supplied as an oscillation control signal to the oscillating device. The oscillating device varies a signal of its oscillating frequency in response to the oscillation control signal. Thus, a new oscillation locking state is initiated.

According to the present invention, the PLL control circuit is provided wherein both a small capture range and a large hysteresis between the capture range and the locking range are prevented, and high-speed phase-locking for the normal frequency can be properly performed.

BRIEF DESCRIPTION OF THE DRAWINGS

The present invention is best understood by reference to the accompanying drawings, in which:

FIG. 3 is a block diagram schematically illustrating the overall configuration of a PLL control circuit according to an embodiment of the present invention.

DETAILED DESCRIPTION OF THE PREFERRED EMBODIMENT

Figure 1:
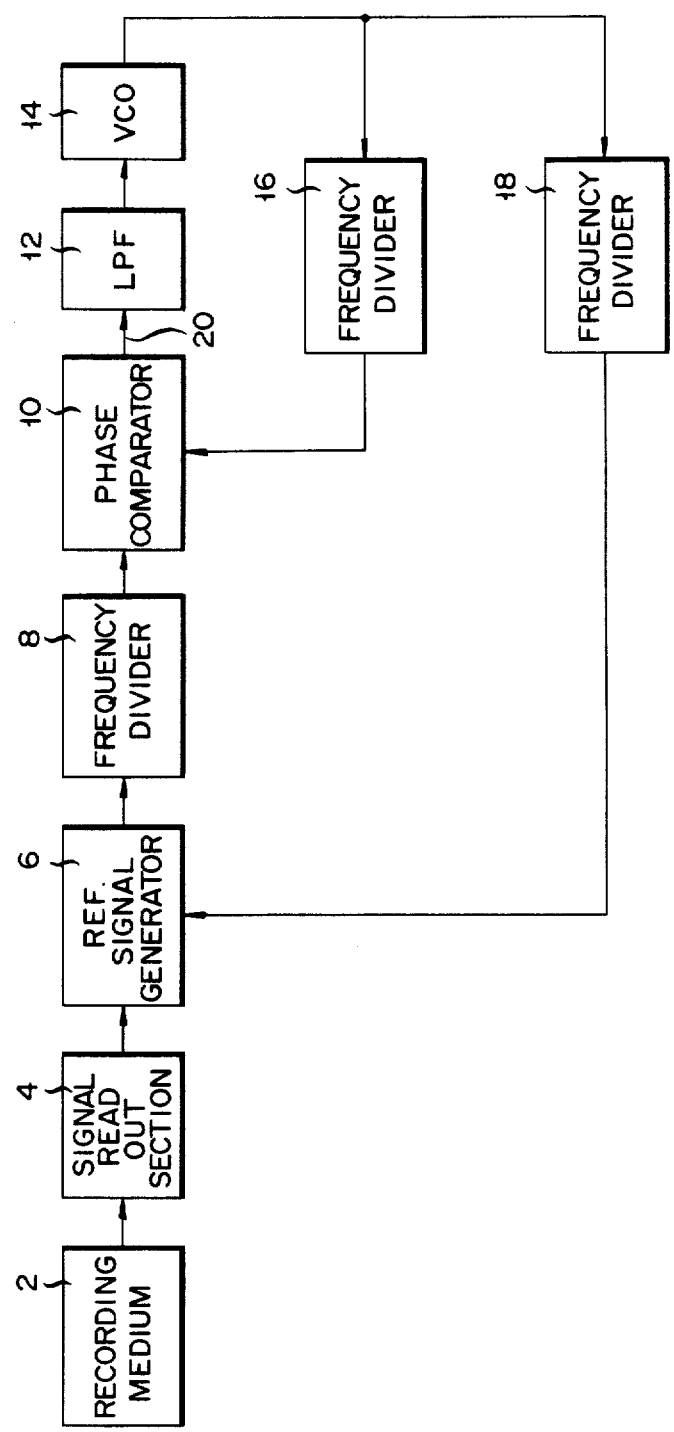
FIG. 1 is a block diagram schematically illustrating the overall configuration of a conventional phase locked loop (PLL) control circuit.

For fully understanding the present invention prior to a description of the PLL control circuit according to an embodiment of the present invention, a conventional PLL control circuit is described with reference to FIG. 1. FIG. 1 shows a conventional PLL control circuit used with a digital audio disk (DAD) system. Referring to FIG. 1, an information signal picked up from a recording medium 2 is transferred through a signal readout section 4 to a reference signal generator 6. An output from the reference signal generator 6 is n-divided by a first frequency divider 8 and is supplied to a phase comparator 10. The phase comparator 10 is connected to a voltage-controlled oscillator 14 (to be referred to as a VCO 14 hereinafter for brevity) through a low-pass filter 12 (to be referred to as an LPF 12 hereinafter for brevity). An output from the VCO 14 is fed back to the phase comparator 10 and to the reference signal generator 6 through a second frequency divider 16 and a third frequency divider 18, respectively. When a signal is supplied from the reference signal generator 6 to the phase comparator 10, the input signal is compared by the phase comparator 10 with the output signal from the VCO 14. An error signal 20 obtained by a difference between the signals described above is produced by the phase comparator 10. In response to the error signal 20, the VCO 14 is operated to control the oscillating frequency so as to minimize the error. In this manner, in the conventional PLL control circuit, the phase of the reference signal extracted from the signal read out from the recording medium 2 differs from the phase of the output from the VCO 14 by a predetermined amount.

As may be apparent from the above description, according to the conventional PLL control circuit used with a PCM digital reproducing device such as digital audio disk (DAD) system, the PLL control operation is performed only by detecting the phase component of the reproduction signal. However, such PLL control operation may not work well. The frequency of a sync clock pulse signal produced by the VCO 14 may often become abnormal even if the conventional PLL control circuit is phase-locked in the following cases: When the readout signal drops out due to a random error or a burst error; when the DAD system is just started; or when a relative rotational speed of the digital audio disk is changed. As a result, the capture range of the VCO 14 is narrowed, so that an undesirably large hysteresis is formed between the capture range and the locking range, the latter being a range of oscillating frequency for locking the VCO 14.

Figure 2:
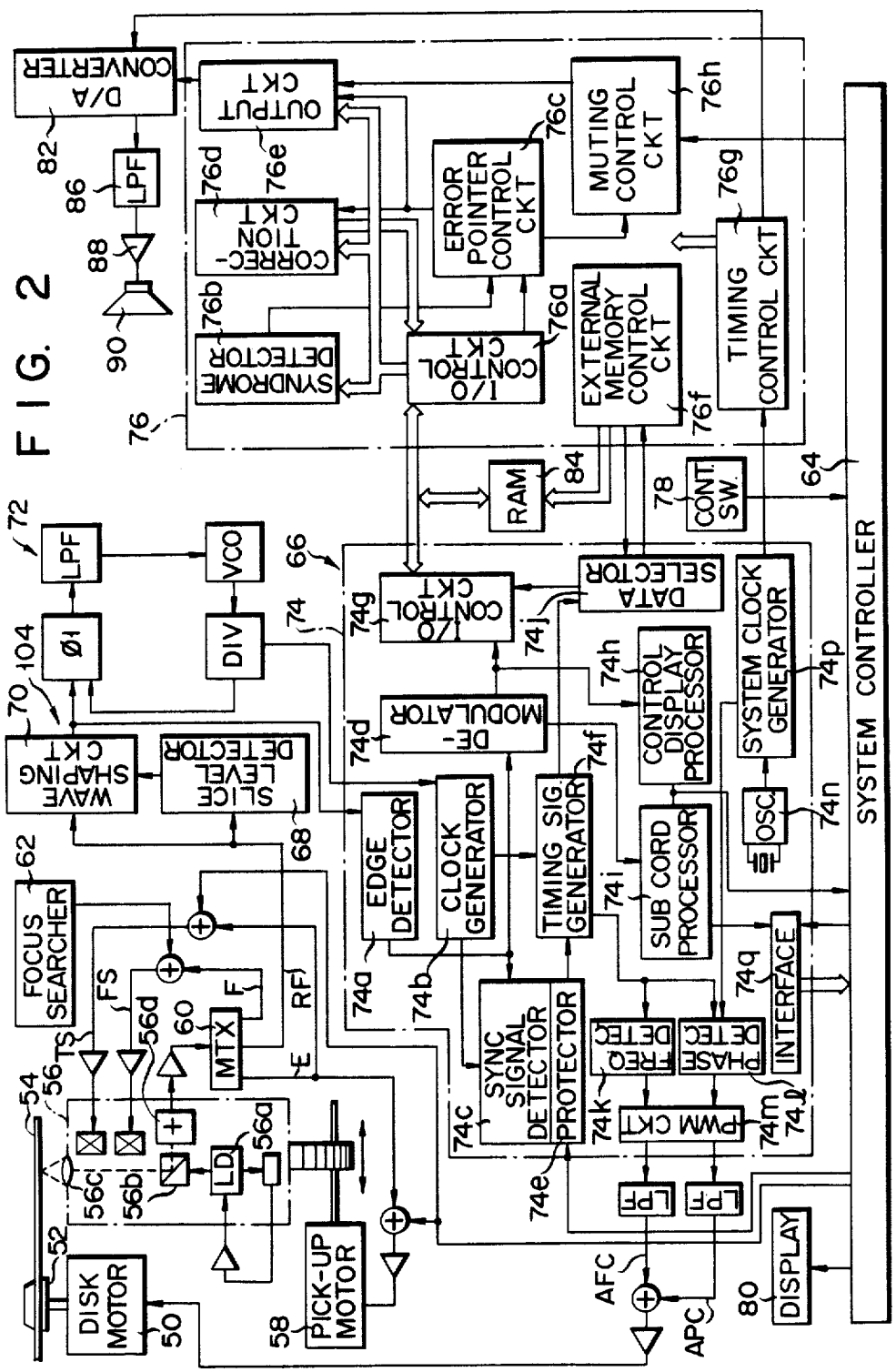
FIG. 2 is a block diagram of the fundamental configuration of an information reproduction system with a digital audio disk (to be referred to as a DAD system hereinafter) to which a PLL control circuit is applied.

Referring now to FIGS. 2 and 3, there is illustrated a digital audio disk (DAD) system including a PLL control circuit in accordance with one embodiment of the present invention. The fundamental configuration of a DAD system which adopts the PLL control circuit will be described with reference to FIG. 2.

In the DAD system of the fundamental configuration shown in FIG. 2, a rotating shaft (not shown) of a DC disk motor 50 is coupled to a turntable 52 which is then rotated. An information recording medium such as an optical disk or digital audio disk 54 mounted on the turntable 52 which is driven by the disk motor 50 is reproduced by means of an optical pickup 56. In this case, the optical pickup 56 radiates light onto the signal recorded surface of the optical disk 54 through a beam splitter 56b and an objective lens 56c. Light which corresponds to digital PCM data of the information signal (audio signal) recorded on the disk 54 in an interleaved manner in accordance with a predetermined modulation system is then reflected by pits (indentation portions with different reflectivities). The reflected light is then guided to a 4-split photodetector 56d through the objective lens 56c and the beam splitter 56b. The photodetector 56d converts the light signal to four readout signals. The photodetector 56d is radially and linearly driven by a pickup motor 58 along the optical disk 54.

Four readout signals from the photodetector 56d are supplied to a matrix circuit 60 (to be referred to as an MTX 60 hereinafter), in which a predetermined matrix operation is performed, thereby providing a focus error signal F, a tracking error signal E and a high frequency signal RF.

The focus error signal F together with a focus search signal from a focus searcher 62 is used to drive a focus servo system FS. The tracking error signal E together with a search control signal (to be described later) supplied via a system controller 64 is used to drive a tracking servo system TS and to control linear tracking performed by the pickup motor 58.

The high frequency signal RF is supplied as a main reproduction signal component to a reproduction signal processing system 66. The reproduction signal processing system 66 supplies the reproduction signal to a wave shaping circuit 70 which is controlled by a slice level (eye pattern) detector 68 so as to separate an unnecessary analog component from a necessary data component. Only the data component is supplied to a PLL control circuit 72 (to be described later in detail), and to an edge detector 74a of a signal processing system 74.

A sync clock pulse from the circuit 72 is supplied to a clock generator 74b of the signal processing system 74 for separating the sync clock pulse and for demodulating data. The sync clock pulse is used to produce a clock pulse for separating the sync signal.

The reproduction signal passing through the edge detector 74a is supplied to a sync signal detector 74c in which the sync signal is separated by the clock pulse. At the same time, the reproduction signal is EFM demodulated by a demodulator 74d. The sync signal is supplied together with the clock pulse for separating the sync signal to a timing signal generator 74f through a protector 74e for protecting the sync signal.

The demodulated signal is supplied to an I/O control circuit 76a of another signal processing circuit 76 to be described later through an I/O control circuit 74g. At the same time, control and display signal components of the demodulated signal are supplied as subcodes to a control display processor 74h and a subcode processor 74i. Subcode data whose error is detected and corrected in the subcode processor 74i is transferred to a system controller 64 through an interface 74q.

The system controller 64 has a microprocessor interface, an IC for a driver and so on (not shown). The system controller 64 controls the DAD reproduction device in a desired state in response to an instruction signal from a control switch 78. At the same time, the system controller 64 causes a display 80 to display the subcode (e.g., index information for music to be reproduced).

A timing signal from the timing signal generator 74f is used to control the I/O control circuit 74g through a data selector 74j. At the same time, this timing signal is supplied to an automatic frequency control AFC and an automatic phase control APC for driving the disk motor 50 in accordance with a linear normal speed CLV system through a frequency detector 74k, a phase detector 74l and a PWM modulator 74m.

In this case, a system clock pulse is supplied to the phase detector 74l from a system clock generator 74p which is operated in response to an oscillation signal from a quartz oscillator 74n.

The errors and interleaving of demodulation data passing through an I/O control circuit 76a of the signal processing system 76 are corrected through a syndrome detector 76b, an error pointer control circuit 76c, a correction circuit 76d and a data output circuit 76e, and the corrected demodulation data is supplied to a D/A converter 82.

In this case, an external memory control circuit 76f in cooperation with the data selector 74j controls an external memory 84 which stores necessary data for correction. The external memory control circuit 76f fetches necessary data for correction through the I/O control circuit 76a. A timing control circuit 76g supplies a timing control signal necessary for correcting an error on the basis of the system clock pulse from the system clock generator 74p.

A muting control circuit 76h performs a predetermined muting operation, both when an error is corrected and when the DAD reproduction device starts operation and finishes operation, on the basis of an output from the error pointer control circuit 76c and the control signal through the system controller 64.

In this manner, the audio reproduction signal converted to the analog signal by the D/A converter 82 is supplied to a speaker 90 through an LPF 86 and an amplifier 88.

The PLL control circuit according to an embodiment of the present invention which is suitable for the DAD reproduction device of the above arrangement will be described with reference to FIG. 3.

Referring to FIG. 3, a signal picked up by the disk 54 is transferred to a signal readout section 104 and is read out therefrom.

To store the digital audio signal in the optical disk 54, the EFM modulation system is used. One sampling signal of a 16-bit word is divided into eight more significant bits and eight less significant bits. One symbol which comprises 8 bits is converted in advance to 14 channel bits in accordance with a predetermined conversion table. In this conversion operation, in order to satisfy various conditions such as the frequency bandwidth of the recording signal, the clock and DC components included in the signal, a minimum inverting period (Tmin) of the EFM signal is set to 3T (T: a pulse period for one bit, which corresponds to a data readout clock pulse). A maximum inverting period (Tmax) is set to 11T.

The output terminal of the signal readout section 104 is connected to an input terminal 106a of a reference signal generator 106 which oscillates or generates a signal 107 at a reference frequency. An output terminal of the reference signal generator 106 is connected through a frequency divider 108 to the first input terminal of a phase comparator 110 having the known arrangement. The frequency divider 108 frequency-divides the reference signal by the predetermined number. The output terminal of the phase comparator 110 is connected to the first input terminal of an adder 112 which has an output terminal connected through a low-pass filter (LPF) 114 to a voltage-controlled oscillator (VCO) 116. The VCO 116 generates the oscillation signal at a given frequency from its output terminal and serves to vary the oscillating frequency of the signal under the control of the output signal from the LPF 114. The output terminal of the VCO 116 is connected to the second input terminal of the phase comparator 110 through a frequency divider 118. The frequency divider 118 functions to frequency-divide an oscillation signal 117 produced from the VCO 116 by a predetermined number. The output terminal of the VCO 116 is also connected to the reference signal generator 106 through a frequency divider 120 which serves to frequency-divide the oscillation signal 117 by a given number. In other words, the oscillation signal 117 from the VCO 116 is fed back to the reference signal generator 106 and the pahse comparator 120 resepctively through the frequency dividers 118 and 120.

The output terminal of the signal readout section 104 is further connected to an input terminal 122a of a detecting cirucit 122 having another input terminal connected through a frequency divider 124 to the output terminal of the VCO 116. The detecting circuit 122 connected at its output terminal to the second input terminal of the adding circuit 112. When the oscillation signal generated from the VCO 116 and frequency-divided by a predetermined number by the frequency divider 124 is supplied to the detector 122, the detector 122 also receives the reproduction signal from the signal readout section 104. The reproduction signal, modulated to have inherent pulse periods between the minimum and maximum inverting period values initially defined in accordance with the EFM system, includes a EFM signal whose inverting period value is defined to be a specific period value between the minimum and maximum inverting period values. The detector, thus, compares the both signals to detect the deviation or difference between the specific period value of the EFM signal included in the digital audio signal and the count result of the output pulse signal from the frequency divider 124 in correspondence with the specific period value. If the deviation is detected between the both signals, the detector 122 produces an output signal 126 corresponding to the deviation. In this embodiment, the specific period value of the EFM signal included in the digital audio signal thus reproduced is preferably set as to be equal to the maximum inverting period value Tmax inherently defined according to the EFM system. Therefore, the circuit 122 serves as a Tmax detector. The output signal 126 is supplied to the adder 112. The output signal 126 from the Tmax detector 122 and an output signal 128 from the phase comparator 110 are added by the adder to produce an oscillation control signal 123 which is used for controlling the oscillation state of the VCO 116.

In the PLL control circuit for the DAD system which has the arrangement described above, the digital audio signal which has the characteristics inherent to the EFM modulation system is read out from the optical disk 54, and is supplied to the reference signal generator 106 and the Tmax detector 122.

When the reference signal generator 106 receives the digital audio signal modulated in accordance with the EFM technique, it determines a reference frequency corresponding to the phase state of the digital audio signal and produces the reference signal 107 having the reference frequency. The reference signal 107 is divided by the frequency divider 108 and supplied to the first input terminal of the phase comparator 110. Since the phase comparator 110 also receives at the second input terminal thereof the oscillation signal 117 which is produced by the VCO 116 and divided by the frequency divider 118, the reference signal 107 and the oscillation signal 117 are compared. The phase comparator 110 then produces the output signal as a comparison signal 128 which corresponds to a difference between the phases of these signals. The comparison signals 128 from the phase comparator 110 is supplied to the adder 112.

Meanwhile, the Tmax detector 122 is operated in response to the data separation clock pulse obtained by frequency division by means of the frequency divider 124 to detect the deviation between the maximum inverting perod Tmax of the EFM modulated digital audio signal and the period value obtained by counting up the pulse components included in the output signal from the frequency divider 124 in correspondence with the Tmax. A frequency component 126 obtained by the Tmax detector 112 is supplied to the adder 112. Therefore, the adder 122 adds the frequency component 126 to a phase component 128 produced from the phase comparator 110. A sum result is supplied as the oscillation control signal 123 to the VCO 116 through the LPF 114, so that the phase of the oscillating frequency of the signal produced by the VCO 116 is controlled. Meanwhile, the oscillation signal 117 from the VCO 116 is continuously supplied as the signal to be compared to the second input terminal of the phase comparator 110 through the frequency divider 118. At the same time, a signal which is controlled by the leading and trailing edges of the readout signal by means of the phase comparator 110 is divided by the frequency divider 108 and supplied as the reference signal to the first input terminal of the phase comparator 110.

In the PLL control circuit which has an arrangement and is operated as described above according to an embodiment of the present invention, the Tmax detector 122 is parallel to a series circuit of the reference frequency generator 106 and the phase comparator 110 and is at the output stage of the signal readout section 104. Since the readout signal includes the EFM signal, a bit gap between a pulse component of logic level "1" and the next pulse component of logic level "1" drops between minimum value Tmin and maximum value Tmax with respect to the data readout clock pulse. The Tmax detector 122 detects the deviation between the maximum value for the number of T during an arbitrary period of the EFM modulated readout signal and the count value which is obtained on the basis of the output pulse signal from the frequency divider 124 and which corresponds to the Tmax, using the period of data readout clock pulse, which is a signal supplied from the PLL control circuit 72 to the clock generator 74b (FIG. 2), as a unit period 1T. The frequency component data signal 126 from the Tmax detector 126 is added to the output from the phase comparator 110, and a sum result is supplied to the VCO 116. Therefore, the frequency control range of the VCO 116 is limited within a desired range. The frequency control range Rf of the present PLL control circuit is defined in a window form as follows:

$$Rf = fc \pm \Delta f \quad \text{for } fc = 1/Tmax$$

where Tmax is the maximum value of actual number of T and $\Delta f$ is the allowable frequency control range. Since the center locking frequency the PLL control circuit is determined in accordance with fc in one-to-one correspondence manner, the phase locking of the PLL control circuit by an abnormal frequency is prevented. Therefore, the capture range of the VCO 116 may not be undesirably narrowed. Therefore, the hysteresis between the phase locking range and the capture range may not be undesirably increased. The output from the VCO 116 is controlled by the normal phase and is quickly and properly phase-locked.

Although the present invention has been shown and described with respect to a particular embodiment, nevertheless, various changes and modifications which are obvious to a person skilled in the art to which the invention pertains are deemed to lie within the spirit, scope and contemplation of the invention. For example, in the above embodiment, the maximum inverting period Tmax of the readout information signal is detected to control the oscillation frequency of the signal from the VCO 116. However, it may be so arranged to detect any other peroid value between the Tmin and Tmax initially defined in accordance with the EFM system in order to control the oscillation of the VCO 116. In the embodiment, the Tmax is selected for controlling the VCO 116 because the frequency of the PLL circuit can be relatively higher to cause the resolution to be improved.

What we claim is:

1. A phase locked loop control circuit for a reproduction system which reproduces an information signal digitally prestored in a recording medium such as an optical disk, said circuit comprising:
    (a) oscillator means for oscillating at a given frequency to produce an oscillation signal from an output terminal thereof and for varying said oscillating frequency of the oscillation signal;
    (b) signal generating means for generating a first electrical signal corresponding to a phase state of the readout digital information signal stored in said recording medium so as to hold its period values included in a range determined by minimum and maximum period values defined in accordance with a chosen modulation system;
    (c) comparator means connected to said signal generating means and to the output terminal of said oscillator means, for receiving the first electrical signal and the oscillation signal respectively at first and second input terminals thereof to compare the first electrical signal with the oscillation signal, and for producing a second electrical signal from an output terminal thereof which corresponds to a phase difference between the first electrical signal and the oscillation signal;
    (d) detector means for extracting a specific period value from a readout information signal to detect the deviation between said specific period value and a period value obtained on the basis of the oscillation signal from said oscillation means and for generating a third electrical signal corresponding to the deviation at an output terminal thereof; and
    (e) adder means connected to output terminals of said comparator means and said detector means, for receiving and adding the second and third electrical signals and for supplying sum data as an oscillation control signal to said oscillator means, whereby said oscillator means varies the oscillating frequency of the oscillation signal therefrom in response to the oscillation control signal to initiate an updated oscillation locking state.

2. A circuit according to claim 1, wherein said digital information signal is prestored in said information recording medium so as to hold predetermined maximum and minimum period values of a readout information signal in accordance with an eight to fourteen modulation method, and said specific period value is preferably so selected to be equal to said maximum period value.

3. A circuit according to claim 2, further comprising:
    first frequency-divider means connected between said signal generating means and said comparator means, for receiving the first electrical signal and for frequency-dividing the first electrical signal by a predetermined number; and
    second frequency-divider means connected between the output terminal of said oscillator means and the second input terminal of said comparator means, for receiving the oscillation signal from said oscillator means and for frequency-dividing the oscillation signal by a second predetermined number.

4. A circuit according to claim 3, further comprising:
    third frequency-divider means connected between the output terminal of said oscillator means and said signal generating means, for frequency-dividing the oscillation signal generated from said oscillator means by a third predetermined number to feed back the oscillation signal to said signal generating means.

5. A circuit according to claim 4, wherein said oscillator means includes a voltage-controlled oscillator.

6. A circuit according to claim 4, further comprising:

fourth frequency-divider means connected between the output terminal of said oscillator means and said detector means, for receiving and frequency-dividing by a fourth predetermined number the oscillation signal from said oscillator means to feed back said oscillation signal to said detector means.

7. A phase locked loop control circuit used for a system for reproducing digital information such as audio data digitally prerecorded in an optical disk so as to hold a pulse period which satisfies a period range determined by minimum and maximum inverting period values inherent in a predetermined modulation technique, said circuit comprising:

(a) signal generating means having an input terminal adapted to be connected to readout means included in said information reproduction system to read out the digital audio data recorded in said optical disk and to produce a digital audio signal corresponding to the digital audio data, for generating a reference signal indicating a reference frequency corresponding to a pulse phase state of the digital audio signal;

(b) first frequency-divider means connected to said signal generating means, for frequency-dividing the reference signal by a first predetermined number;

(c) voltage-controlled oscillator means for oscillating at a given frequency to generate an oscillation signal from an output terminal thereof;

(d) second frequency-divider means connected to the output terminal of said voltage-controlled oscillator means, for frequency-dividing a variable frequency of the oscillation signal by a second predetermined number;

(e) comparator means connected to said first and second frequency-divider means, for comparing the reference signal and the oscillation signal, which are frequency-divided, to generate an error signal corresponding to a frequency difference between said frequency-divided reference and oscillation signals from an output terminal thereof;

(f) detector means having an input terminal adapted to be connected to said readout means, for detecting a frequency component included in the digital audio signal on the basis of a specific value between the minimum and maximum inverting period values of the digital audio signal initially defined in accordance with the predetermined modulation technique to generate a detection signal indicating the frequency component from the output terminal thereof; and (g) adder means connected to said comparator means, to the output terminal of said detector means and to said oscillator means, for adding the error signal to the detection signal and for supplying a sum signal as an oscillation control signal to said oscillator means, whereby said voltage-controlled oscillator means varies the oscillating frequency in response to the oscillation control signal.

8. A circuit according to claim 7, further comprising third frequency-divider means connected between the output terminal of said voltage-controlled oscillator means and said detector means, for frequency-dividing the oscillation signal by a third predetermined number and for supplying a divided oscillation signal as a data separation signal to said detector means, and wherein said detector means performs detection in response to the data separation signal.

* * * * *